United States Patent [19]

Garrett

[11] Patent Number: 5,058,307

[45] Date of Patent: Oct. 22, 1991

[54] BEAN TRAWL PICKUP DEVICE

[76] Inventor: Michael J. Garrett, 203 Hickory La., Lutz, Fla. 33549

[21] Appl. No.: 552,478

[22] Filed: Jul. 16, 1990

[51] Int. Cl.$^5$ .............................................. A01K 73/02
[52] U.S. Cl. .................................................... 43/9.1
[58] Field of Search ............................ 43/8, 9.1, 9.8;
254/336, 337, 394, 398, 399

[56] References Cited

U.S. PATENT DOCUMENTS 4,201,369  5/1980  Betta .................................. 254/394
4,690,381  9/1987  Asai .................................... 254/394

Primary Examiner—Kurt Rowan

[57] ABSTRACT

A beam trawl pickup device comprising a pickup block with three cable guides and a pickup block pulley. Cables are connected from a beam trawl through the guides in the pickup block. The central cable passes around the pickup block pulley and is attached to the pickup block. The pickup block pulley being of a size to pass through the block at the end of the outrigger on a fishing boat while the pickup block remains tight against the same block allowing a beam trawl to be raised by the center cable but be towed by all three cables.

1 Claim, 3 Drawing Sheets

BEAN TRAWL PICKUP DEVICE

BACKGROUND OF THE INVENTION

This invention relates to beam trawl type fishing nets, and more particularly, to beam trawl type fishing nets used on shrimp boats. It specifically relates to the method of handling the beam trawl on the fishing boat.

Shrimping today is done with a large variety of boats and net sizes. In general, the vast majority of shrimp are taken by trawling a net across the bottom of the ocean. Net size and the number of nets fished vary depending on the capabilities of the boat. The largest boats will trawl with 4–40 ft. nets. The nets are pulled with steel cable attached through outriggers extending from the sides of the boat. The nets consist of 2 sides a top and a bottom. These are attached together to form a net with a roughly rectangular front cross-section which reduces in size from front to back of the net. In the rear of the net a "bag" is attached. This bag receives all the catch from the net and can be closed at the top and pulled with a winch aboard the boat. The bottom of the bag can be opened thus releasing the catch on the boat. The main body of the net is left hanging over the side of the boat while the bag is recovered. Once emptied, the back of the bag is re-closed and the entire net is ready for fishing. The top front of the net is fitted with a head rope (or cork line) which can have floats attached to raise the top of the net higher. The bottom of the net is hung with chain so that it drags the bottom. "Tickler chains" are suspended several feet ahead of the net. These chains drag the bottom and kick up shrimp which are then caught by the net.

Two methods are currently used to keep the front of the net open to catch shrimp. In the currently most widely used method, devices called doors are attached to the outer edges of the front of the net. These doors are large flat devices which are rigged vertically in the water. When the boat goes forward, water pressure on the doors causes them to travel outward thus spreading the net. This is equivalent to dragging a funnel through the water. The doors drag over the bottom thus stirring up mud and debris which enters the net. To keep the net open the boat must travel approximately 2.8 mph. At a lower speed, the doors will either collapse toward the center of the net or roll over thus stopping the net from fishing. Care must be taken when setting the nets overboard since the doors will flip over if not properly placed in the water and against the tide (the tide keeps the net ballooned as the doors are lowered). Additionally, the doors are not effective on rough bottoms as they dig into dips etc. In certain areas where offshore drilling has taken place, a sediment called "blue mud" exists. When a rig with doors encounters this condition, either the doors dig into the mud and fill the net, or the entire rig can be lost from the boat.

Large amounts of cable are required as the rig needs to be pulled almost horizontally to function.

On large boats using multiple nets, a metal sled is placed between two nets and doors are placed on the outer edge of each net. In this configuration, a cable is attached to the sled and cables are attached to the doors. The three cables are brought together and pulled as one unit. The sled is a metal framework with a flat bottom much like a ski. The sled travels over the bottom and is kept upright by the pull of the doors on either side. On one side of a large boat one would find two doors, a sled and 2–40 ft. nets. In the water, since the nets are spread by water pressure, only ⅔ of maximum net opening exists. 2–40 ft. nets have a net fishing width of 52 ft. (26 ft. ea.).

Large horsepower boats are required to overcome the resistance of water on the doors. As the nets fill with catch, mud or debris, the pull of the net backwards pulls the doors inward thus reducing the net opening further. Increased speed (and horsepower) are used to overcome this. Eventually the nets will close completely unless brought up and emptied.

Problems are encountered when executing a turn with the nets in the trawling position. A turn must be made very large to keep the inside door on the net from rolling over and collapsing the net.

The life of the current door type trawl is very limited. The doors plow the bottom and need replacement every 6 to 12 months. If they are used on a rocky bottom, the doors can be destroyed at any time by striking a rock.

The popularity of this type of unit is due totally to the ease with which it is handled on the fishing boat. In general fishing boats, and in particular shrimp fishing boats, have large power winches located in the center of the boat. Outriggers which can be raised for docking or lowered for fishing extend up to fifty or more feet from each side of the boat. A large block is located at the end of each outrigger. Steel cable one half inch in diameter or larger runs up each outrigger and over the block at the end from the winch. The various cables attached to the fishing trawl are attached to the end of this cable. In the horizontal, or fishing, position, the block at the end of the outrigger is approximately fifteen feet above the water.

When a door trawl unit is raised, the cables attached to the trawl travel over the outrigger block and down to and around the winch. The doors come together and are raised completely clear of the water at the end of the outriggers. In this position, the doors are out of the water and out of the way. This process is repeated each time the net is emptied, which can be as frequently as once per hour.

An alternative to the doors on the outside edges of the nets has existed since at least the 1300's. It consists of a beam which spreads the net to its full width. This has been used in a limited manner in Alaskan waters (very rough bottom) for 40+ years. The net is spread vertically on the sides with "plumb staffs" which are 3 or 4 foot posts loosely attached at their midpoint to the ends of the beam. The sides of the net are attached to the plumb staffs and the top and bottom of the net are the same as in the normal trawl. This trawl is particularly effective on very steep slopes. A more modern version of the beam trawl consists of a metal beam supported between two metal sleds. The sleds spread the net vertically and support the beam a set distance from the bottom. The top of the net is laced to the beam and the bottom is free to drag the bottom slightly behind the top of the net. The sleds have curved bottoms to allow them to slide easily over the bottom.

Beam trawl units have none of the disadvantages of the door type trawls. The always remain open, they do not stir up the bottom and collect debris and they slide over soft areas. Beam trawl units require significantly less horsepower to operate and have proven to be more efficient fishers than door trawl units.

The most serious disadvantage of a beam trawl is the difficulty in safely and conveniently handling it on the boat. Large boats require beam trawls of fifty or more feet in length. The beam trawl must be pulled with three or more cables. As a minimum one cable attaches to the center of the beam and one cable attaches to each sled, or each end of the beam. The three cables are brought together and attached to the boats main cable in the same manner as the door trawl.

While another advantage of the beam trawl is the shorter cables required, they are still generally as long as the beam. A fifty foot beam trawl would have approximately fifty foot cables attached to it. When the trawl is raised by the boat winch, the attachment of the three cables cannot go over the block. If it is allowed to do so, the beam will be bent by the outer cables tightening at a faster rate than the center cable. Since the end of the outrigger is only fifteen feet above the water, a beam trawl of over fifteen or so feet cannot be raised clear of the water without raising the outrigger. In heavy seas, raising the outrigger each time the net is emptied is a dangerous and time consuming task. When the outrigger is raised, the beam swings in toward the boat. Even in calm weather, extra crew are required to guide the beam and insure that it does not strike the boat.

Storage of the beam trawl also presents a problem. Since the trawl cannot be raised against the outrigger, it must be stored along side of the boat. In most harbors, this will not work as boats are tied side by side.

For these reasons, the beam trawl has been limited in use to smaller boats fishing in calm waters.

SUMMARY OF THE INVENTION

The present invention provides a method and apparatus which overcomes the disadvantages of the prior art; the provision of a method and apparatus which allows a beam trawl of any length to be lifted completely clear of the water and up to the outrigger block; and a method of storing the beam trawl on the outrigger.

The above and other objects, features, and advantages are obtained in a beam trawl pickup device utilizing a pickup block and a pickup block pulley. The center cable of a beam trawl is passed through the pickup block, around the pickup block pulley and attached to the pickup block. The outer cables pass through the pickup block to the attachment of the boat cable at the top of the pickup block pulley.

Among the several advantages of the beam trawl pickup device are:

(1) Since the beam trawl can be lifted up to the outrigger block and clear of the water, it can be safely handled on the boat.

(2) Since the beam trawl can be lifted clear of the water when emptying the net, the outrigger need not be raised and beam trawls that are nearly twice the length of the distance from the side of the boat to the end of the outrigger may be used.

(3) Since the beam trawl can be raised against the outrigger, it can be securely attached to the outrigger when not in use and raised for storage.

(4) While the device described is specifically intended for fishing boats and beam trawls, it is applicable to any other situation where a long object is raised by a series of cables.

(5) While the device described consists of provisions for three cables, minor reconfiguration will allow the use of more cables. Additionally, the device may be cascaded allowing a group of beams to be lifted.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
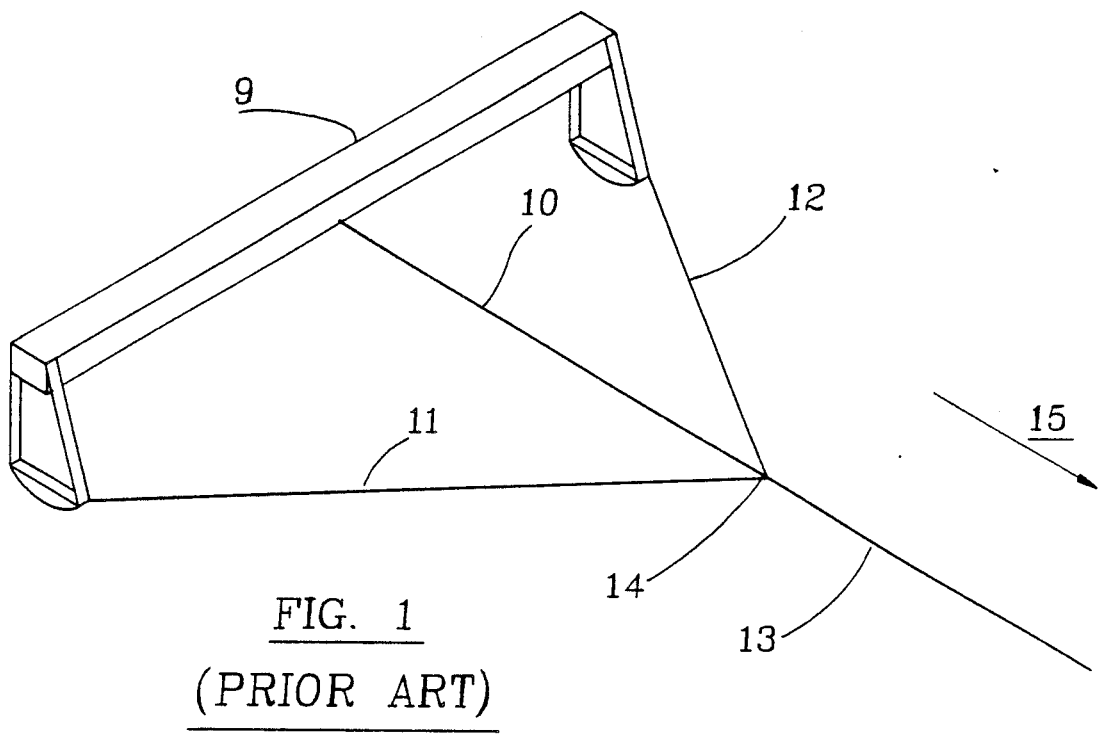
FIG. 1 is a schematic representation of the prior art beam trawl cable connections.

Before describing the present invention, reference is first made to FIG. 1 in which there is shown a beam trawl 9 with center cable 10, outer cables 11, 12, and a boat cable 13 attached together at point 14. The direction of travel of the trawl is indicated by the arrow. For simplicity sake, the net is not shown but it trails behind the trawl in a direction opposite to the arrow. If the trawl is raised, and the attachment point 14 is allowed to pass over the boats Outrigger block, cables 11 and 12 are forced toward each other. Very quickly, this force damages the trawl.

Figure 2:
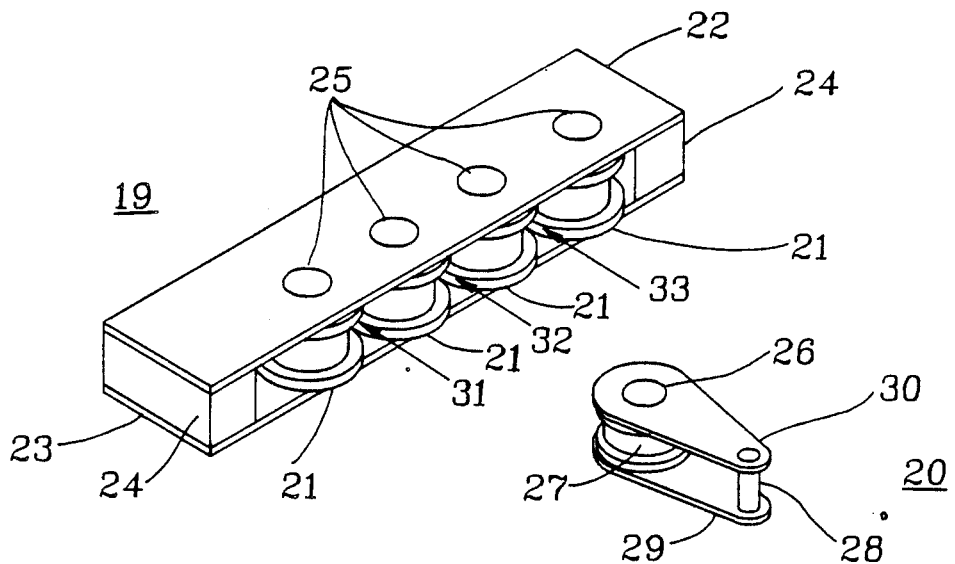
FIG. 2 illustrates a beam trawl pickup device consisting of a pickup block and pickup block pulley in accordance with the present invention.

Turning now to FIG. 2, is shown one embodiment of the beam trawl pickup device in accordance with the present invention. The beam trawl pickup device consists of a pickup block 19, and a pickup block pulley 20. The devices may be constructed in any number of configurations from any number of materials. The pickup block indicated is comprised of a top plate 22 and a bottom plate 23. The plates are parallel and separated by spacers 24 which forms a frame of rectangular cross section. Four shafts 25 are inserted through holes in both plates and four grooved rollers 21 are free to spin on the shafts between the plates and form three tapered holes 31,32,33 in the pickup block 19. The pickup block pulley 20 is constructed in a similar manner with a shaft 26 running through a top plate 30, a grooved roller 27 and finally a bottom plate 29. Plates 29 and 30 are parallel. In the front of the pickup block pulley a pin 28 is attached between the plates. While the device shown has rollers, the pickup block itself could be a simple as a block with three holes drilled in it.

Figure 3:
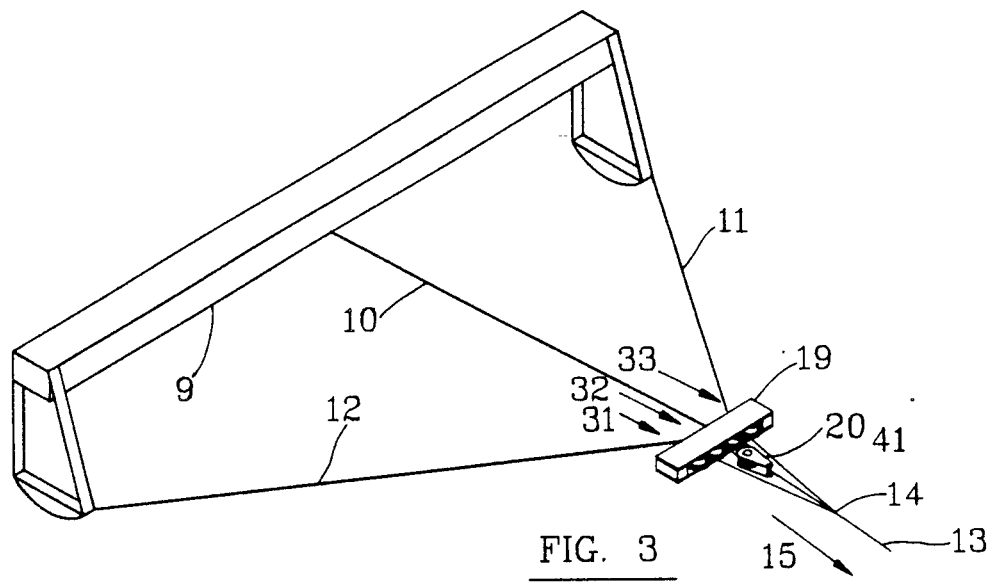
FIG. 3 illustrates a beam trawl pickup device in accordance with the present invention and attached to a beam trawl.

Turning to FIG. 3 there is shown a pickup block pulley 20 and a pickup block 19 in the configuration for pulling the beam trawl 9. Cable 10 is attached at one end to the center of the beam, it passes through the center cable guide 32 in the pickup block 19, through the pickup block pulley 20 and the remaining end is attached to the pickup block 19. Cables 11 and 12 are attached at one end to the sleds 42 and 43 and pass through the outer cable guides 31,33 in the pickup block 19. The other end of cables 11 and 12 are attached to the boat cable 13 at attachment point 14 A short cable 41 is attached at one end to the pickup block pulley 20 and at the other end to the boat cable 13 at point 14. Direction of travel is as indicated by the arrow 15.

Figure 4:
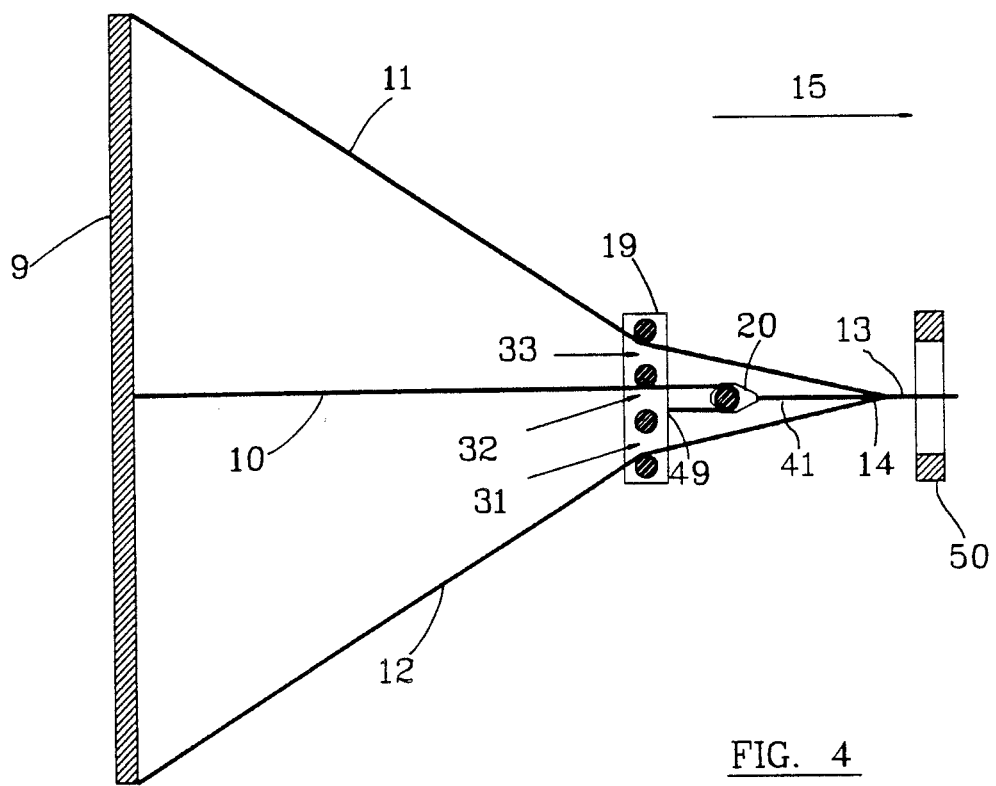
FIG. 4 is a schematic representation of the beam trawl pickup device attached to a beam trawl in normal fishing or lowered position.

A better understanding of the connections can be had by turning to FIG. 4 where which is a schematic representation of the device with the tops of the pickup block 19 and the pickup block pulley 20 removed to expose the holes 31, 32 and 33. The pulley 50 at the end of the outrigger (not shown) is also sectioned to show the path the cables will take over it. The device is shown in the normal down or fishing position. Direction of travel is as shown by the arrow 15. Cable connections are identical to FIG. 3 where the center cable 10 is attached at one end to the center of the trawl 9, it then passes through the center hole 32 in the pickup block 19, travels around the pickup block pulley 20 and attaches to the pickup block 19 at point 49. Outer cables 11 and 12 attach to the ends of the trawl 9, pass through the outer holes 31 and 33 in the pickup block 19 and attach to the main boat cable 13 at point 14. The pickup block pulley 20 is attached to the main boat cable 13 by cable 41. The main boat cable 13 passes over the block 50 at the end of the outrigger and goes down to the boat winch (not shown). When the boat moves forward, cable 13 is placed in tension. This in turn puts tension on cables 41, 11 and 12. Cable 41 pulls the pickup block pulley 20 in the same direction 15 as cable 13, thus placing cable 10 in tension. This pulls the pickup block 19 up against the pickup block pulley 20. In this position the beam trawl 9 is pulled in the direction shown 15 by all three cables 11,12 and 10.

Figure 5:
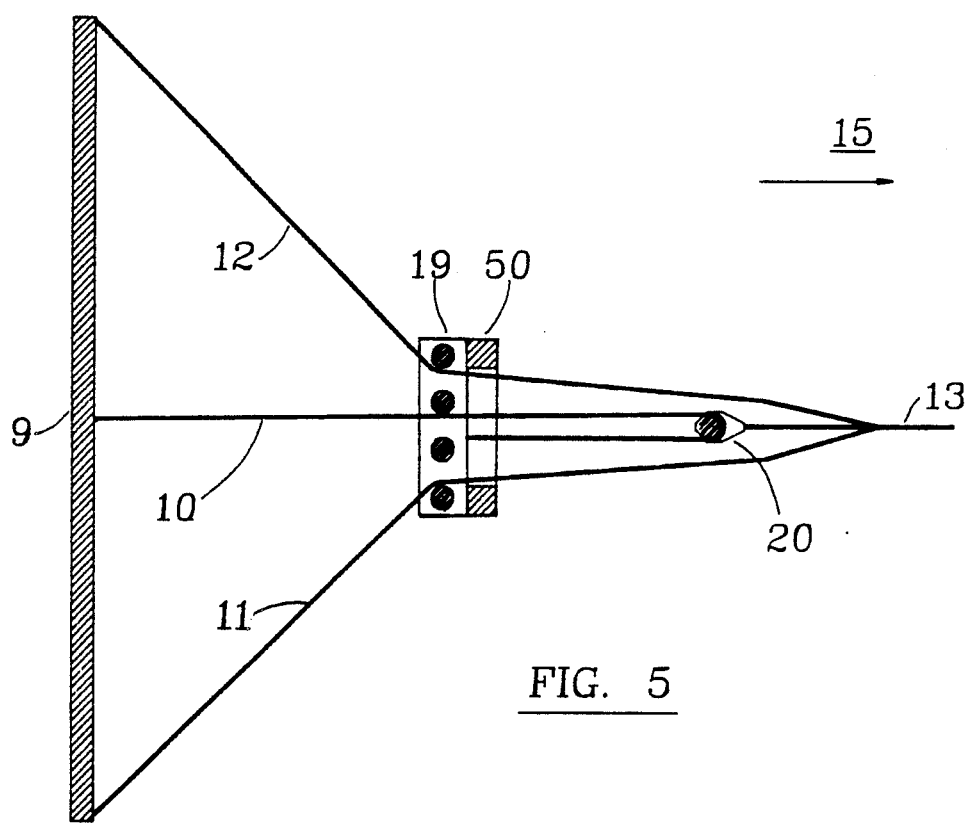
FIG. 5 is a schematic representation of the beam trawl pickup device attached to a beam trawl shown as the trawl is beginning to be raised.

FIG. 5 shows the same connections as FIG. 4. In this figure, the beam trawl 9 is shown as it being lifted out of the water by the boat winch. In this position, as the main cable 13 passes over the block 50 at the end of the outrigger, it pulls the ends of the outer cables 11 and 12, and the pickup block pulley 20 over the block 50. The pickup block 19 is too large to pass over the block 50 and remains against it. In this position cable 10 is shortening at twice the rate of the outer cables 11 and 12. The full weight of the trawl 9 is picked up by the center cable 10 and the outer cables 11 and 12 begin to relax.

Figure 6:
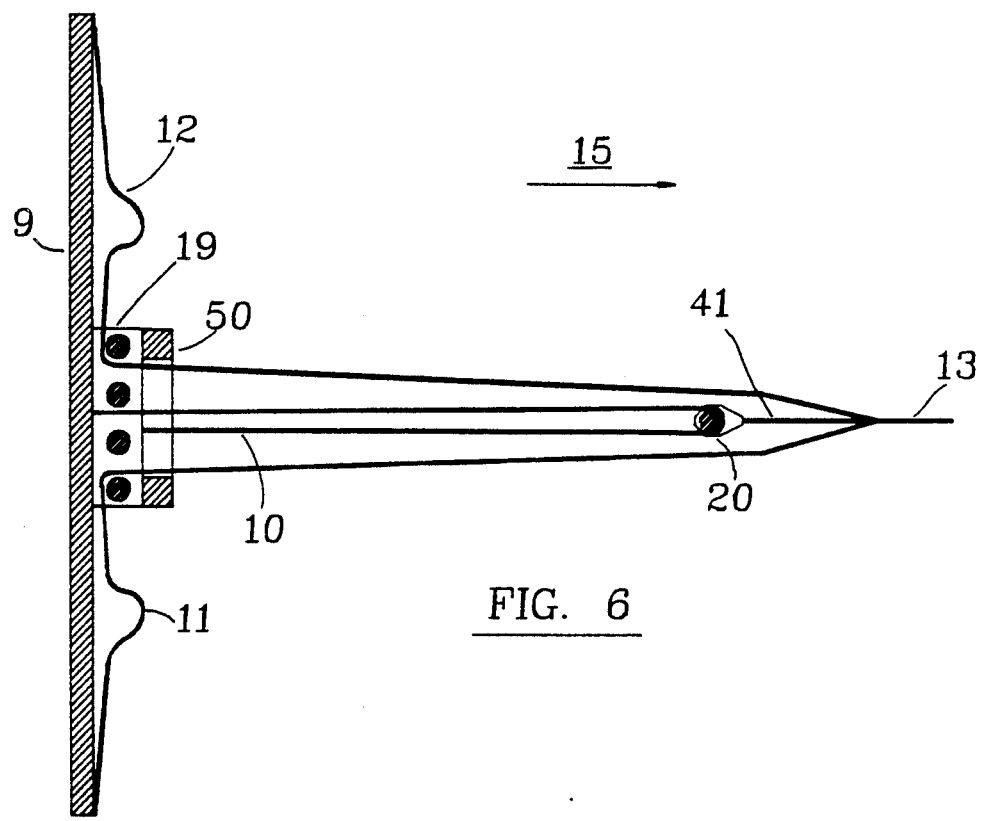
FIG. 6 is a schematic representation of the beam trawl pickup device attached to a beam trawl in the fully raised position.

Turning to FIG. 6, the pickup of the trawl continues from FIG. 5. In FIG. 6, the trawl 9 is shown in the fully raised or stored position. The full weight of the trawl 9 is carried by the center cable 10 and the outer cables 11 and 12 are fully relaxed. The pickup block 19 is tight against the boat block 50 and the trawl 9 is tight against the pickup block 19. Redeploying the beam trawl for fishing is accomplished by releasing cable 13. The entire process proceeds in reverse until the trawl is back in the position indicated in FIG. 4.

What has been described is a beam trawl pickup device consisting of a pickup block and a pickup block pulley. The pickup block may be of any construction but must be larger than the opening in the block at the end of the fishing boat's outrigger. It has a center hole or guide for the center cable and a point of attachment for the same cable. It has two outer holes or guides to guide the outer cables onto the boat block. The pickup block pulley is a single pulley small enough and of sufficient structural strength to enable it to be pulled over a larger pulley without damage. The diameter of the pickup block pulley must be greater than the minimum bend radius of the cables used. For multistrand "soft" steel cables one half inch in diameter this is about one and a quarter inch.

While the invention has been shown in what is presently considered to be it's preferred embodiment, various modifications and arrangements will become apparent to those of ordinary skill in the art. It is intended therefore, that the invention not be limited to the preferred embodiment but be interpreted within the spirit and scope of the appended claims.

What is claimed is:

1. A beam trawl pickup device to be used in conjunction with a beam trawl on a fishing boat and comprising:
   (a) a pickup block consisting of two parallel plates separated by fixed spacers at each end and forming a frame of rectangular cross section wherein four grooved rollers are rotatably supported by four shafts rotatably fixed between the parallel plates, said rollers being spaced equally and forming three cable guides, with a point of rigid attachment provided near the center of one plate for a cable; and
   (b) a pickup block pulley consisting of two parallel plates separated by two pins rigidly attached to the plates where one pin is a shaft which rotatably supports a grooved roller which forms a single cable guide and the second pin forms a rigid attachment point for a cable; and
   (c) four cables, two of which are attached at one end to the outer ends of a beam trawl, pass through the outer two cable guides on the pickup block and are attached at the other ends to the end of the fishing boat cable, while the third cable is attached at one end to the center of the beam trawl, passes through the center cable guide of the pickup block, passes around the cable guide in the pickup block pulley and is attached at the other end to the pickup block, while the fourth cable is attached at one end to the pickup block pulley and attached at the other end to the main boat cable at the same point as the outer cables, whereby when the main boat cable is pulled in over the block, the pickup block pulley will pass over the block and the pickup block will not pass over the block, and the full weight of the trawl is picked up by said third cable.

* * * * *